(12) United States Patent
Shin

(10) Patent No.: US 11,376,952 B1
(45) Date of Patent: Jul. 5, 2022

(54) IN-WHEEL DRIVING DEVICE AND METHOD FOR ASSEMBLING THE SAME

(71) Applicant: HYUNDAI MOBIS CO., LTD., Seoul (KR)

(72) Inventor: Kyeong Ho Shin, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/469,188

(22) Filed: Sep. 8, 2021

(30) Foreign Application Priority Data

May 6, 2021 (KR) .......................... 10-2021-0058683

(51) Int. Cl.
  *B60K 17/04* (2006.01)
  *B60K 7/00* (2006.01)
(52) U.S. Cl.
  CPC .......... *B60K 17/046* (2013.01); *B60K 7/0007* (2013.01)
(58) Field of Classification Search
  CPC .. B60K 17/046; B60K 17/145; B60K 7/0007; F16H 3/48
  See application file for complete search history.

(56) References Cited

U.S. PATENT DOCUMENTS

| | | | | |
|---|---|---|---|---|
| 5,246,082 A * | 9/1993 | Alber | ....................... | A61G 5/04 180/907 |
| 6,688,412 B2 * | 2/2004 | Kima | ................... | B60K 17/356 180/65.6 |
| 7,556,580 B2 * | 7/2009 | Saito | ...................... | H02K 7/116 475/149 |
| 8,863,874 B2 * | 10/2014 | Lee | ...................... | B60K 17/046 180/65.51 |
| 2012/0248850 A1 * | 10/2012 | Hirano | .................... | F16D 65/12 301/6.5 |
| 2021/0001712 A1 * | 1/2021 | Misu | ................... | F16H 57/0426 |

* cited by examiner

*Primary Examiner* — Tinh Dang
(74) *Attorney, Agent, or Firm* — Morgan, Lewis & Bockius LLP

(57) ABSTRACT

The present disclosure relates to an in-wheel driving device and a method for assembling the same, and the in-wheel driving device includes a driving motor including a motor shaft, a reducer which interworks with the driving motor to reduce a rotational force of the driving motor, a reducer housing, in which the reducer is disposed, a first gear connected to the reducer, and a support bearing part which supports the reducer on an outer side of the reducer, the reducer includes a sun gear connected to the motor shaft, a ring gear disposed in the reducer housing, a planetary gear disposed between the sun gear and the ring gear and engaged with the sun gear and the ring gear, and a carrier, in which the sun gear is disposed in an interior thereof, which supports the planetary gear and rotates in conjunction with rotation of the planetary gear.

14 Claims, 6 Drawing Sheets

IN-WHEEL DRIVING DEVICE AND METHOD FOR ASSEMBLING THE SAME

CROSS-REFERENCE TO RELATED APPLICATION

This application claims the benefit of priority to Korean Patent Application No. 10-2021-0058683, filed in the Korean Intellectual Property Office on May 6, 2021, the entire contents of which are incorporated herein by reference.

TECHNICAL FIELD

The present disclosure relates to an in-wheel driving device and a method for assembling the same, and more particularly to an in-wheel driving device for stably supporting a reducer, and a method for assembling the same.

BACKGROUND

An in-wheel driving device relates to a technology used in a vehicle, such as an electric vehicle, which employs electricity as a power source, and unlike a scheme of rotating wheels via transmission of power through an engine-transmission-driving shaft mechanism in a gasoline or diesel vehicle, directly drives wheels with motors provided in the interior of wheels.

Since a motor and a reducer that constitute the in-wheel driving device are disposed in the interior of the wheel together with existing components, such as a suspension device, a steering device, and a brake device, it is important to dispose the in-wheel driving device in the interior of the wheel without any interference with the existing components by minimizing the size of the motor and the reducer while securing a sufficient output and a sufficient torque.

Conventionally, because the reducer equipped with planetary gears may implement a high reduction ratio while maintaining a compact size, it is advantageous in constituting a package. However, because the reducer using the planetary gears may be deformed in a power transmitting process, a sufficient support is necessary.

In detail, the reducer equipped with the planetary gears includes a plurality of planetary gears and a carrier for supporting the planetary gears. Furthermore, a small-diameter gear may be connected to the carrier for an output and a circumscribed gear may be connected to the small-diameter gear to transmit the reduced power. However, in the process of transmitting the power, a repulsive force (load) may be applied between the small-diameter gear and the circumscribed gear, and accordingly, the load transmitted to the small-diameter gear may be transmitted to the carrier while the small-diameter gear is pressed. Due to this, the planetary gears may be decentered while the carrier is deformed, and accordingly, noise may be generated in the planetary gears and durability may deteriorate.

Accordingly, it is necessary to improve the in-wheel driving device such that the carrier may be sufficiently supported whereby deformation of the carrier may be prevented.

SUMMARY

The present disclosure has been made to solve the above-mentioned problems occurring in the prior art while advantages achieved by the prior art are maintained intact.

An aspect of the present disclosure provides an in-wheel driving device that minimizes deformation of a carrier, to which planetary gears are coupled, by supporting opposite axial ends of the carrier with a reducer housing, and a method for assembling the same.

The present disclosure also provides an in-wheel driving device that minimizes noise due to planetary gears and improve the durability of a reducer by preventing decentering of the planetary gears, and a method for assembling the same.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an in-wheel driving device includes a driving motor including a motor shaft, a reducer which interworks with the driving motor to reduce a rotational force of the driving motor, a reducer housing, in which the reducer is disposed, a first gear connected to the reducer, and a support bearing part which supports the reducer on an outer side of the reducer, the reducer includes a sun gear connected to the motor shaft, a ring gear disposed in the reducer housing, a planetary gear disposed between the sun gear and the ring gear and engaged with the sun gear and the ring gear, and a carrier, in which the sun gear is disposed in an interior thereof, which supports the planetary gear and rotates in conjunction with rotation of the planetary gear, the first gear is connected to an outer side of the carrier, and the support bearing part is disposed between the reducer housing and the carrier and is mounted on one end and an opposite end of the carrier in an axial direction of the carrier.

The reducer housing may be configured to be adhered to the support bearing part and the support bearing part may be configured to be adhered to the carrier such that the one end and the opposite end of the carrier are supported by the reducer housing.

The in-wheel driving device may further include a second gear installed in the reducer housing and configured to rotate while being engaged with the first gear.

The support bearing part may include a first bearing mounted on the one end of the carrier, and a second bearing mounted on the opposite end of the carrier.

The carrier may include a body having an interior space, in which the sun gear is disposed, wherein the planetary gear is coupled to the body, a first gear coupling part formed on an opposite axial side of the body, which is opposite to one axial side of the body, wherein the first gear is coupled to the first gear coupling part; a first bearing mounting part formed on the one axial side of the body and to which the first bearing is coupled; and a second bearing mounting part formed on an opposite axial side of the first gear coupling part, which is opposite to one axial side of the first gear coupling part, wherein the second bearing is coupled to the first bearing mounting part.

A plurality of planetary gear may be disposed along a circumferential direction of the sun gear, the body may further include a planetary gear coupling part coupled with the plurality of planetary gears, and the planetary gear coupling part may have a plurality of gear seating recesses located at a circumference of the interior space such that the plurality of planetary gears are coupled to and seated in the plurality of gear seating recesses, respectively.

A size of at least one of the plurality of gear seating recess may be larger than a size of the sun gear.

An axial width of the at least one of the plurality of gear seating recesses may be larger than an axial width of the sun gear, and a circumferential width of the at least one of the plurality of gear seating recesses may be larger than a circumferential width of the sun gear.

An axial width of the carrier may be larger than an axial width of the sun gear, and a circumferential width of the carrier may be larger than a circumferential width of the sun gear.

The reducer housing may include a ring gear mounting part, on which the ring gear is mounted, a first bearing seating part located on one side of the ring gear mounting part, and disposed at a location corresponding to the first bearing mounting part such that the first bearing is seated between the first bearing seating part and the first bearing mounting part, and a second bearing seating part located on an opposite side of the ring gear mounting part, and disposed at a location corresponding to the second bearing mounting part such that the second bearing is seated between the second bearing seating part and the second bearing mounting part.

The reducer housing may include a first housing part and a second housing part that are coupled to each other and define a space in which the reducer is disposed, the ring gear mounting part and the first bearing seating part may be formed in the first housing part, and the second bearing seating part may be formed in the second housing part.

According to an aspect of the present disclosure, a method for assembling an in-wheel driving device includes a sun gear assembling operation of inserting a sun gear into an interior space of a carrier through a gear seating recess formed in a planetary gear coupling part of the carrier, a planetary gear assembling operation of disposing a planetary gear such that the planetary gear is seated in the gear seating recess and is enmeshed with the sun gear and coupling the planetary gear to the planetary gear coupling part, a first gear assembling operation of assembling the first gear in the carrier such that the first gear rotates together with the carrier when the carrier rotates, a support bearing part assembling operation of assembling a first bearing and a second bearing in the carrier such that the first bearing is disposed on one side of the planetary gear and the second bearing is disposed on an opposite side of the first gear, and a housing assembling operation of mounting a reducer assembly, in which the sun gear, the planetary gear, the carrier, the first gear, the first bearing, and the second bearing are assembled, in an interior of the reducer housing.

The housing assembling operation may include an operation of assembling the first bearing and the second bearing such that the first bearing is disposed between the reducer housing and one end of the carrier and the second bearing is disposed between the reducer housing and an opposite end of the carrier.

The support bearing part assembling operation may include an operation of assembling the first bearing and the second bearing such that the carrier and the first bearing, the carrier and the second bearing are adhered to each other, and the housing assembling operation may include an operation of mounting the reducer assembly such that the first bearing and the reducer housing, and the second bearing and the reducer housing are adhered to each other.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, embodiments of the present disclosure will be described in detail with reference to the accompanying drawings.

First, the embodiments described below are embodiments that are suitable for understanding of the technical features of an in-wheel driving device and a method for assembling an in-wheel driving device according to the present disclosure. However, the present disclosure is not limited to the embodiment described below or the technical features of the present disclosure are not limited by the described embodiments, and the present disclosure may be variously modified without departing from the technical scope of the present disclosure.

Figure 1:
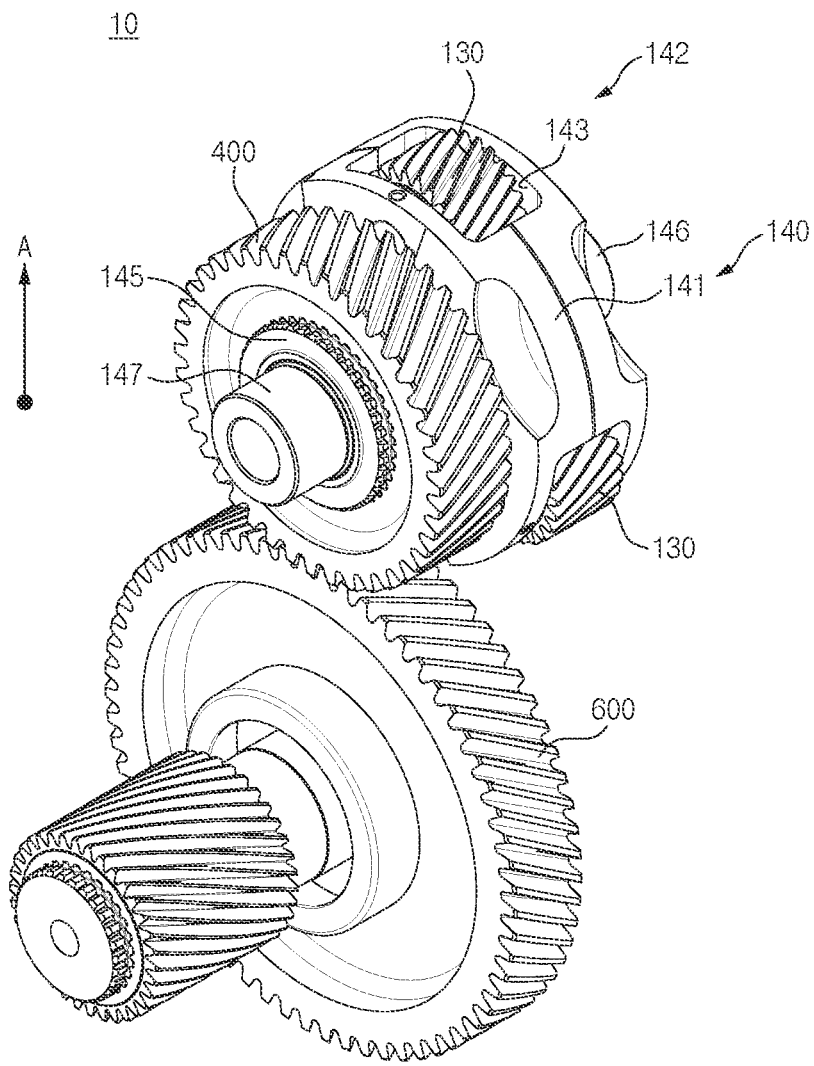
FIG. 1 is a perspective view illustrating an in-wheel driving device according to an embodiment of the present disclosure.
Figure 2:
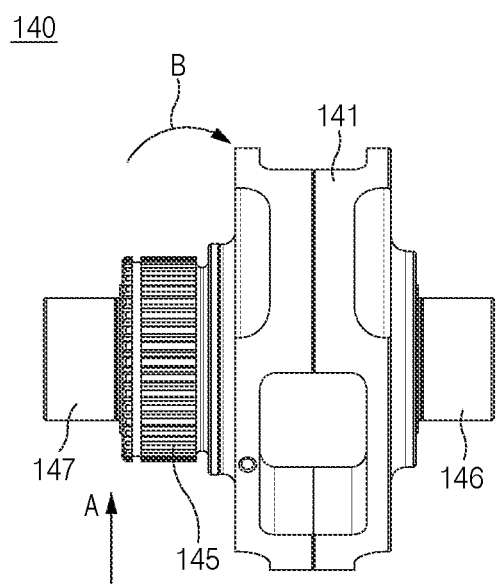
FIG. 2 is a front view of a carrier according to an embodiment of the present disclosure.
Figure 3:
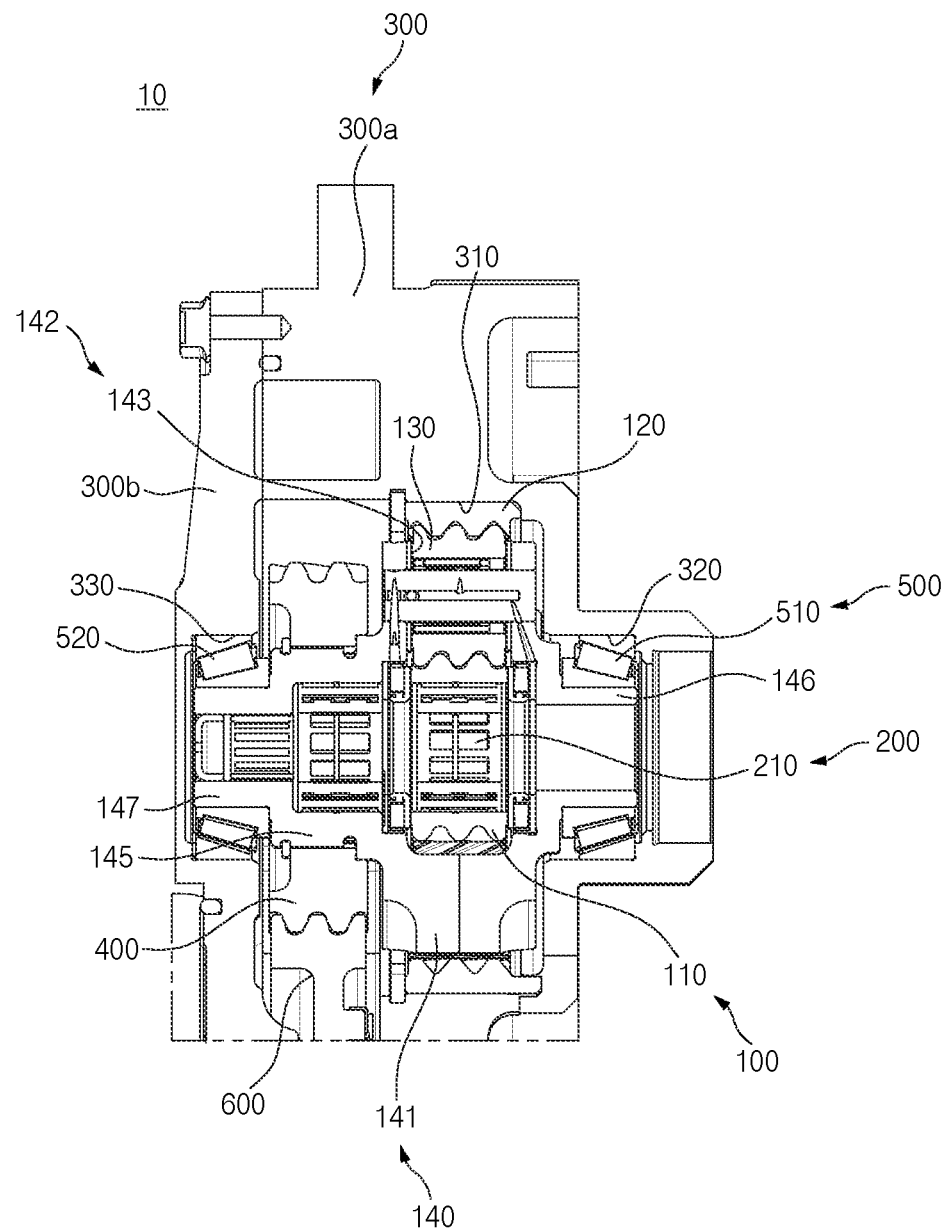
FIG. 3 is a cross-sectional view illustrating a cross-section of an in-wheel driving device according to an embodiment of the present disclosure, and is a view illustrating a state, in which a reducer is installed in an interior of a reducer housing.
Figure 4:
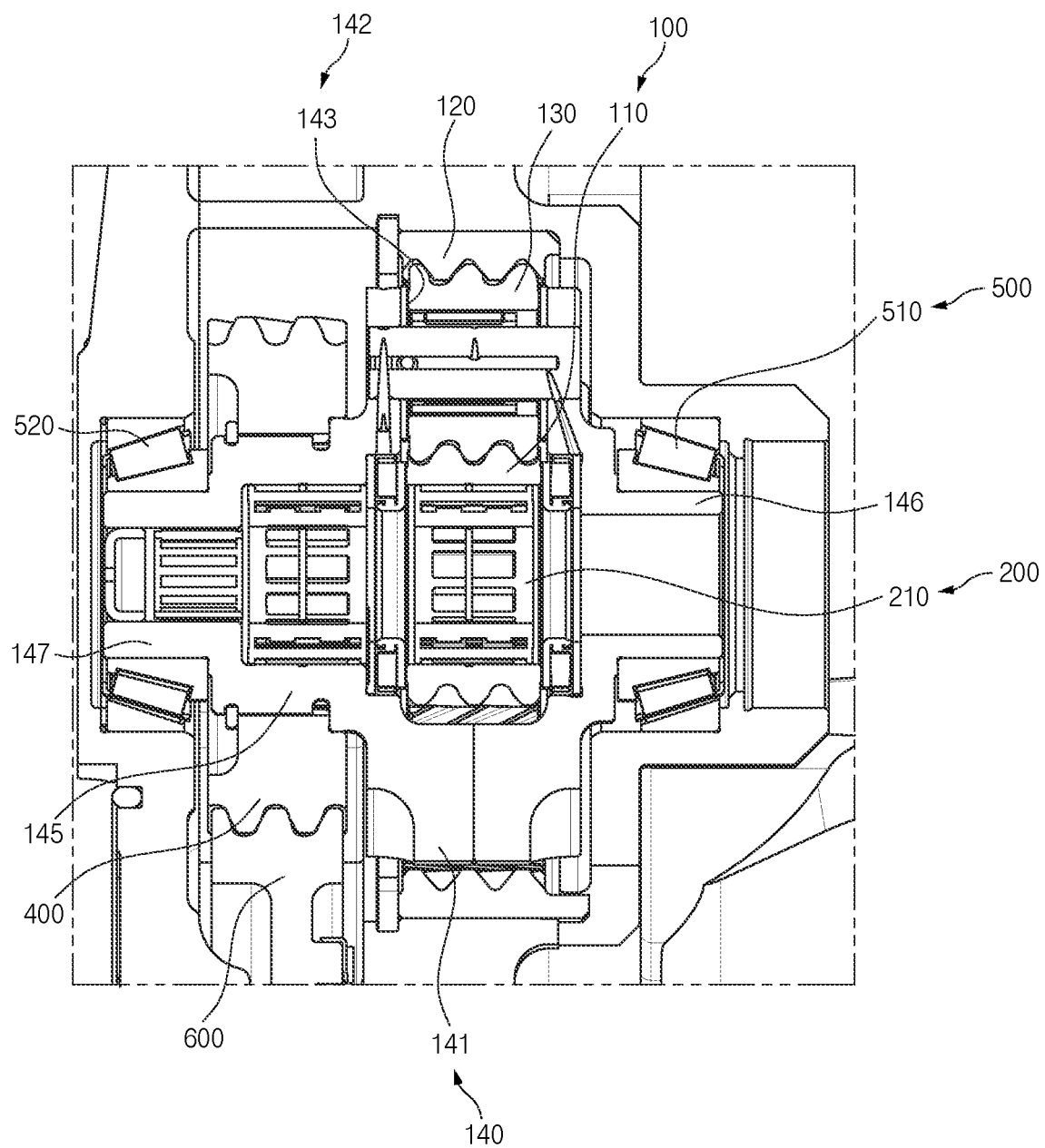
FIG. 4 is an enlarged cross-sectional view illustrating a portion of FIG. 3.
Figure 5:
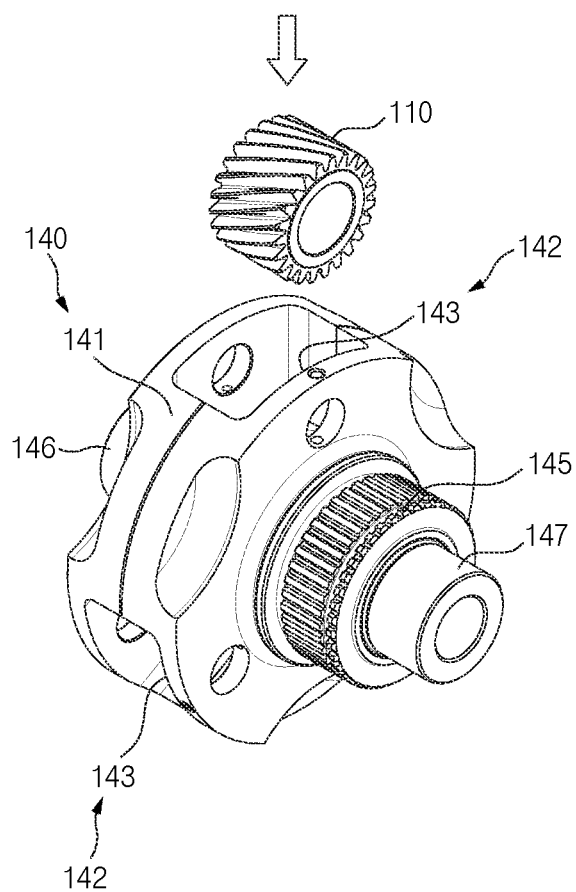
FIG. 5 is a view illustrating a process of assembling a sun gear in a carrier according to the present disclosure.
Figure 6:
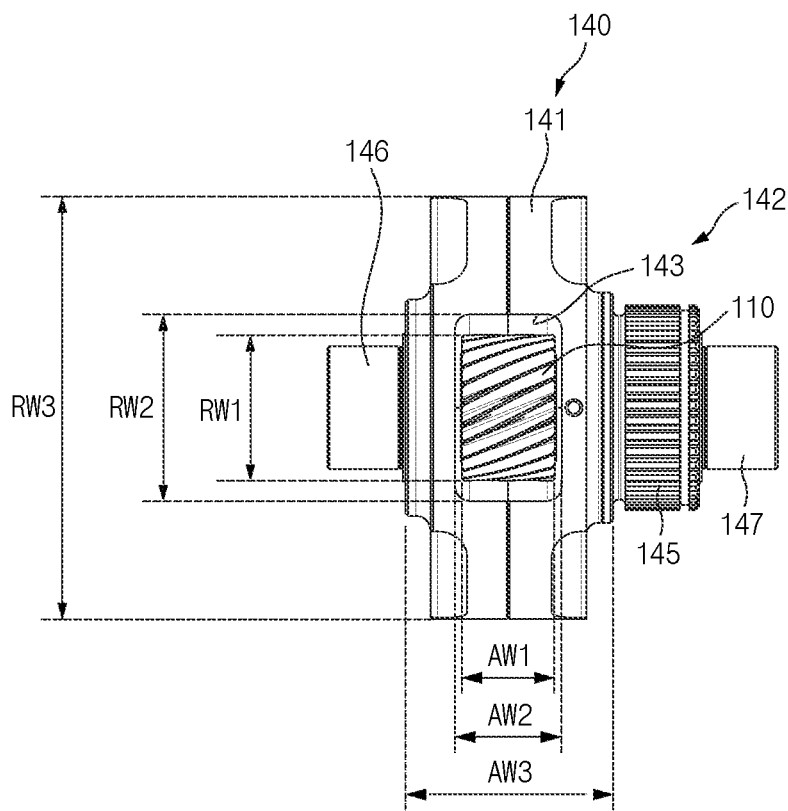
FIG. 6 is a top view of a carrier according to an embodiment of the present disclosure, viewed from the top.

FIG. 1 is a perspective view illustrating an in-wheel driving device according to an embodiment of the present disclosure. FIG. 2 is a front view of a carrier according to an embodiment of the present disclosure. FIG. 3 is a cross-sectional view illustrating a cross-section of an in-wheel driving device according to an embodiment of the present disclosure, and is a view illustrating a state, in which a reducer is installed in an interior of a reducer housing. FIG. 4 is an enlarged cross-sectional view illustrating a portion of FIG. 3. FIG. 5 is a view illustrating a process of assembling a sun gear in a carrier according to the present disclosure. FIG. 6 is a top view of a carrier according to an embodiment of the present disclosure, viewed from the top.

Referring to FIGS. 1 to 6, an in-wheel driving device 10 according to the embodiment of the present disclosure includes a driving motor 200, a reducer 100, a reducer housing 300, a first gear 400, and a support bearing part 500 assembled in an interior of a wheel of a vehicle.

The driving motor 200 generates a rotational force, and includes a motor shaft 210.

The reducer 100 may be configured to interwork with the driving motor 200 and to reduce a rotational speed of the motor shaft 210 provided in the driving motor 200. The reducer 100 may be connected to the motor shaft 210 to receive the rotational force generated by the driving motor 200, and may reduce the rotational force and output the reduced rotational force.

The reducer 100 may be housed in an interior of the reducer housing 300. The reducer housing 300 may be coupled to the driving motor 200 or an interior of the wheel, and may include a space for housing the reducer 100 in an interior thereof.

The first gear 400 may be connected to the reducer 100 to rotate. The first gear 400 is a gear for transmitting the power reduced by the reducer 100.

In detail, the reducer 100 may include a sun gear 110, a ring gear 120, a planetary gear 130, and a carrier 140.

The sun gear 110 may be connected to the motor shaft 210. For example, the sun gear 110 may be splined to the motor shaft 210 to rotate together with the motor shaft 210. The ring gear 120 may be mounted on the reducer housing 300 to be supported by the reducer housing 300.

The planetary gear 130 may be configured to be engaged between the sun gear 110 and the ring gear 120. In detail, the planetary gear 130 may be enmeshed between the sun gear 110 and the ring gear 120, and may rotate while revolving about the sun gear 110 when the sun gear 110 rotates.

The sun gear 110 may be housed in an interior of the carrier 140, and the carrier 140 may support the planetary gear 130 and may rotate in conjunction of rotation of the planetary gear 130. Furthermore, the first gear 400 may be splined to an outer side of the carrier 140, and may rotate together with the carrier when the carrier 140 rotates.

The support bearing part 500 may be configured to support the reducer 100 on an outer side of the reducer 100.

In detail, the support bearing part 500 may be disposed between the reducer housing 300 and the carrier 140, and may be mounted on one end and an opposite end of the carrier 140 in an axial direction of the carrier 140. Here, the one axial direction of the carrier 140 may be an inward direction, that is, a direction that faces the driving motor 200 (the right side of FIG. 1), and the opposite axial direction of the carrier 140 may be a side that is opposite to the one axial direction of the carrier 140 (the left side of FIG. 1).

In detail, the support bearing part 500 may include a first bearing 510 that is mounted on the one axial end of the carrier 140, and a second bearing 520 that is mounted on the opposite axial end of the carrier 140.

The reducer housing 300 may be adhered to the support bearing part 500 such that the one end and the opposite end of the carrier 140 are supported by the reducer housing 300 when the reducer 100 is assembled in the reducer housing 300 and the support bearing part 500 may be attached to the carrier 140. In this way, the carrier 140 may be supported by the first bearing 510 and the second bearing 520 to be rotatable at two points.

Meanwhile, the present disclosure may further include a second gear 600. The second gear 600 may be installed in the reducer housing 300, and may be engaged with the first gear 400 to be rotatable. In detail, the second gear 600 may be a gear that receives power from the first gear 400, for example, the second gear 600 may be a gear that transmits the rotational force transmitted through the first gear 400 to a wheel of a vehicle, and the first gear 400 and the second gear 600 may be connected to each other in a circumscribed gear connection scheme.

A power transmitting process using the structure will be described as follows. First, the sun gear 110 connected to the motor shaft 210 may rotate through an operation of the driving motor 200. When the sun gear 110 rotates, the planetary gear 130 engaged with the sun gear 110 may revolve about the sun gear 110 while rotating. Then, because the carrier 140 that supports the planetary gear 130 rotates together with the planetary gear 130, a rotational speed of the sun gear 110 may be reduced in the carrier 140.

Furthermore, when the carrier 140 rotates, the first gear 400 splined to the carrier 140 may rotate together. When the first gear 400 rotates, the second gear 600 engaged with the first gear 400 may rotate, and accordingly, the rotational force may be transmitted to the wheel of the vehicle directly or indirectly (see FIG. 1).

Meanwhile, in the power transmitting process, the carrier 140 may be deformed by a repulsive force between the first gear 400 and the second gear 600. A load may be applied to the first gear 400 by the second gear 600 (see direction A of FIGS. 1 and 2), and accordingly, a repulsive force may be applied to the first gear 400 (see direction B of FIG. 2). Furthermore, the carrier 140 may be deformed by the repulsive force generated in the first gear 400, and accordingly, a location of the planetary gear 130 may be decentered. Accordingly, noise may be caused in the planetary gear 130, and durability may deteriorate. Accordingly, it is necessary to sufficiently support the carrier 140 to prevent the deformation.

As described above, because opposite ends of the carrier 140 according to the present disclosure are supported by the reducer housing 300 through the support bearing part 500, a support force of the carrier 140 may be improved. In detail, the carrier 140 may be supported by the reducer housing 300 at two support points, through the first bearing 510 and the second bearing 520. Furthermore, because the first bearing 510 and the second bearing 520 are mounted on one axial end and an opposite axial end of the carrier 140, an interval between the two support points may become larger.

In this way, according to the present disclosure, because the opposite axial ends of the carrier 140 are supported by the reducer housing 300, deformation of the carrier 140 due to the load transmitted by the first gear 400 may be minimized. Furthermore, accordingly, noise of the planetary gear 130 may be minimized and the durability of the reducer 100 may be improved by preventing decentering of the planetary gear 130.

For example, when at least one of the two support points that support the carrier 140 is disposed between the carrier 140 and the motor shaft 210, the carrier 140 is supported by the motor shaft 210, and in this case, the carrier 140 may not be stably supported because the carrier 140 may be deformed due to driving of the motor shaft 210 that is a rotational element. Furthermore, when at least one of the two support points that support the carrier 140 is not disposed at the opposite ends of the carrier, the interval between the two support points becomes smaller so that the carrier 140 may not be stably supported.

The first bearing 510 and the second bearing 520 according to the present disclosure may be mounted on the opposite axial ends of the carrier 140 while being mounted between the carrier 140 and the reducer housing 300, and accordingly, the carrier 140 may be stably supported by the reducer housing 300 at the two support points that are spaced apart from each other by a large interval.

Meanwhile, referring to FIGS. 1 to 6, the carrier 140 may include a body 141, a first gear coupling part 145, a first bearing mounting part 146, and a second bearing mounting part 147. Here, the body 141, the first gear coupling part 145, the first bearing mounting part 146, and the second bearing mounting part 147 may be integrally formed and may be the respective parts of the carrier 140, but the present disclosure is not limited thereto.

The body 141 may be provided with an interior space, in which the sun gear 110 is housed, and the planetary gear 130 may be coupled to the body 141.

In detail, a plurality of planetary gears 130 may be disposed along a circumferential direction of the sun gear 110. Furthermore, the body 141 may further include a planetary gear coupling part 142, to which the planetary gear 130 is coupled, and the planetary gear coupling part 142 may include a gear seating recess 143.

A plurality of gear seating recesses 143 are provided at a circumference of the interior space such that the plurality of planetary gears 130 are coupled to the planetary gear coupling part 142, and the planetary gears 130 may be seated in the gear seating recesses 143. That is, the planetary gears 130 may be assembled such that at least partial areas thereof are inserted into the gear seating recesses 143 and are engaged with the sun gear 110. Planetary gear shaft holes may be formed in the planetary gear coupling part 142, and planetary gear shafts may pass through the planetary gear coupling part 142 and the planetary gears 130, through the planetary gear shaft holes, in a state in which the planetary gears 130 are seated in the gear seating recesses 143. Accordingly, the planetary gears 130 may be assembled in the carrier 140 to be rotatable.

A first gear coupling part 145 may be formed on an opposite axial side of the body 141, which is opposite to one axial side of the body 141, and the first gear 400 may be coupled to the first gear coupling part 145. For example, the first gear coupling part 145 may be splined, and may be splined to the first gear 400. Accordingly, when the carrier 140 rotates, the first gear coupling part 145 may rotate together with the first gear 400.

A first bearing mounting part 146 may be formed on the one axial side of the body 141, and the first bearing 510 may be coupled to the first bearing mounting part 146. A second bearing mounting part 147 may be formed on an opposite axial side of the first gear coupling part 145, which is opposite to one axial side of the first gear coupling part 145, and the second bearing 520 may be coupled to the second bearing mounting part 147.

Then, the first bearing mounting part 146 and the first bearing 510 may be attached to each other when being assembled as an outer surface of the first bearing mounting part 146 corresponds to an inner diameter of the first bearing 510, and the second bearing mounting part 147 and the second bearing 520 may be attached to each other when being assembled as an outer surface of the second bearing mounting part 147 corresponds to an inner diameter of the second bearing 520. Accordingly, the first bearing 510 and the second bearing 520 may stably support the carrier 140.

Meanwhile, for example, the carrier 140 may have a first part disposed on one side of a space, in which the sun gear 110 is housed, and a second part disposed on an opposite side thereto. Furthermore, the first part and the second part may be coupled to each other through welding or the like to form an interior space, the planetary gear coupling part 142, and a motor shaft through-hole. The first bearing mounting part 146 and an oil passage may be formed in the first part, and the first gear coupling part 145 and the second bearing mounting part 147 may be formed in the second part. However, the method for manufacturing the carrier 140 and the shape of the carrier 140 are not limited to the above description, and may be modified in various schemes.

Meanwhile, referring to FIGS. 5 and 6, the sun gear 110 according to the present disclosure may be inserted into the interior space through an opening of the gear seating recess 143 to be assembled with the carrier 140.

To achieve this, a size of at least one of the plurality of gear seating recesses may be larger than a size of the sun gear 110.

In detail, when it is assumed that an axial direction of the motor shaft 210 is an axial direction and a direction that is perpendicular to the motor shaft 210 and follows a circumference of the carrier 140 is a circumferential direction, an axial width AW1 of the sun gear 110 may be smaller than an axial width AW2 of the gear seating recess 143. Furthermore, a circumferential width RW1 of the sun gear 110 may be formed to be smaller than a circumferential width RW2 of the gear seating recess 143.

Furthermore, an axial width of the carrier of the carrier 140 may be formed to be larger than the width AW1 of the sun gear 110. In detail, an axial width AW3 of the body 141 provided in the carrier 140 may be formed to be larger than the axial width AW1 of the sun gear 110. Furthermore, a circumferential width RW3 of the carrier 140 may be formed to be larger than the axial width AW3 of the carrier 140 (refer to FIG. 6). Accordingly, the sun gear 110 may be inserted into the interior space through the gear seating recess 143.

According to the present disclosure, due to the structure, because the sun gear 110 is assembled through the gear seating recess 143, a structure, in which the first bearing 510 is disposed between the one end of the carrier 140 and the reducer housing 300, may be implemented. In detail, conventionally, because the sun gear 110 is assembled to pass through the interior space of the carrier 140 while being coupled to the motor shaft 210, it is difficult to dispose an existing bearing between the one end of the carrier 140 and the reducer housing 300. Meanwhile, according to the present disclosure, the sun gear 110 may be configured to be inserted through the gear seating recess 143 of the carrier 140 so that the first bearing mounting part 146 may be formed at the one end of the carrier 140. Accordingly, the present disclosure may implement a structure, in which the opposite ends of the carrier 140 are supported by the reducer housing 300.

Meanwhile, the reducer housing 300 may include a ring gear mounting part 310, a first bearing seating part 320, and a second bearing seating part 330.

The ring gear mounting part 310 may be formed on an inner surface of the reducer housing 300, that is, a surface of the reducer housing 300, which faces a space, in which the reducer 100 is housed, and the ring gear 120 may be mounted on the ring gear mounting part 310.

The first bearing seating part 320 may be located on one side of the ring gear mounting part 310, and may be formed at a location corresponding to the first bearing mounting part 146 such that the first bearing 510 is seated in the first bearing seating part 320. In a state, in which the first bearing 510 is assembled, the first bearing seating part 320 may be adhered to the first bearing 510 to stably support the one end of the carrier 140.

The second bearing seating part 330 may be located on an opposite side of the ring gear mounting part 310, and may be formed at a location corresponding to the second bearing mounting part 147 such that the second bearing 520 is seated in the second bearing seating part 330. In a state, in which the second bearing 520 is assembled, the second bearing seating part 330 may be adhered to the second bearing 520 to stably support the opposite end of the carrier 140.

Meanwhile, referring to FIG. 3, the reducer housing 300 may include a first housing part 300a and a second housing part 300b that form the space, in which the reducer 100 is housed, through coupling thereof. For example, the first housing part 300a and the second housing part 300b may be coupled to each other through bolting, but the present disclosure is not limited thereto.

The ring gear mounting part 310 and the first bearing seating part 320 may be formed in the first housing part 300a, and the second bearing seating part 330 may be formed in the second housing part 300b. For example, when it is assumed that a component, in which the sun gear 110, the planetary gears 130, the carrier 140, the first gear 400, the first bearing 510, and the second bearing 520 are assembled, is a reducer assembly, the first housing part 300a and the second housing part 300b are coupled to each other in the axial direction of the carrier 140 in a state, in which the reducer assembly is housed in the first housing part 300a so that the reducer assembly may be assembled in an interior of the reducer housing 300.

However, the configuration of the reducer housing 300 is not limited to the above description.

Meanwhile, hereinafter, the method for assembling the in-wheel driving device 10 according to the embodiment of the present disclosure will be described. The method for assembling the in-wheel driving device 10 according to the embodiment of the present disclosure, which will be described below, is a method for assembling the above-described in-wheel driving device 10, and a repeated description of the same configurations will be omitted below.

The method for assembling the in-wheel driving device 10 according to the embodiment of the present disclosure includes a sun gear assembling operation, a planetary gear assembling operation, a first gear assembling operation, a support bearing part assembling operation, and a housing assembling operation.

The sun gear assembling operation is an operation of inserting the sun gear 110 into the interior space of the carrier 140 through the gear seating recess 143 formed in the planetary gear coupling part 142 of the carrier 140.

In detail, the size of at least one of the plurality of gear seating recesses 143 may be larger than the size of the sun gear 110. For example, the size of all the plurality of gear seating recess 143 may be larger than the size of the sun gear 110. Furthermore, the axial width of the carrier 140 may be larger than the axial width of the sun gear 110, and the circumferential width of the carrier 140 may be larger than the circumferential width of the sun gear 110.

In this way, according to the present disclosure, because the sun gear 110 is assembled through the gear seating recess 143, a structure, in which the first bearing 510 is disposed between the one end of the carrier 140 and the reducer housing 300, may be implemented. In detail, conventionally, because the sun gear 110 is assembled to pass through the interior space of the carrier 140 while being coupled to the motor shaft 210, it is difficult to dispose a bearing between the one end of the carrier 140 and the reducer housing 300. Meanwhile, according to the present disclosure, the sun gear 110 may be configured to be inserted through the gear seating recess 143 of the carrier 140 so that the first bearing mounting part 146 may be formed at the one end of the carrier 140. Accordingly, the present disclosure may implement a structure, in which the opposite ends of the carrier 140 are supported by the reducer housing 300.

In the planetary gear assembling operation, the planetary gears 130 may be seated in the gear seating recesses 143, may be disposed to be enmeshed with the sun gear 110, and may be coupled to the planetary gear coupling part 142. In detail, the planetary gears 130 may be seated in the gear seating recesses 143 to be engaged with the sun gear 110, and the planetary gear shafts may pass through the planetary gears 130 and be coupled to the planetary gear coupling part 142 to be rotatable.

In the first gear assembling operation, the first gear 400 may be assembled in the carrier 140 such that the first gear 400 rotates together with the carrier 140 when the carrier 140 rotates. For example, the first gear 400 may be splined to the first gear coupling part 145 formed in the carrier 140, and may be coupled to the carrier 140 to rotate together with the carrier 140.

In the support bearing part assembling operation, the first bearing 510 and the second bearing 520 may be assembled in the carrier 140 such that the first bearing 510 is disposed on one side of the planetary gears 130 and the second bearing 520 is disposed on the opposite side of the first gear 400. That is, the first bearing 510 and the second bearing 520 may be mounted on the opposite axial ends of the carrier 140.

In the housing assembling operation, the reducer assembly, in which the sun gear 110, the planetary gears 130, the carrier 140, the first gear 400, the first bearing 510, and the second bearing 520 are assembled, may be mounted in the interior of the reducer housing 300.

For example, the reducer housing 300 may be formed by coupling the first housing part 300a and the second housing part 300b. Furthermore, in the housing assembling operation, the reducer assembly may be assembled in the interior of the reducer housing 300 by coupling the first housing part 300a and the second housing part 300b in the state, in which the reducer assembly is housed in the first housing part 300a.

After the housing assembling operation, the motor shaft 210 may pass through the reducer housing 300.

In the housing assembling operation, the first bearing 510 may be disposed between the reducer housing 300 and the one end of the carrier 140, and the second bearing 520 may be disposed between the reducer housing 300 and the opposite end of the carrier 140.

Meanwhile, in the support bearing part assembling operation, the carrier 140 and the first bearing 510, and the carrier 140 and the second bearing 520 may be assembled to be adhered to each other.

Furthermore, in the housing assembling operation, the first bearing 510 and the reducer housing 300, and the second bearing 520 and the reducer housing 300 may be assembled to be adhered to each other. Due to the structure, the one end of the carrier 140 and the opposite end of the carrier 140 may be supported by the reducer housing 300.

According to the embodiment of the present disclosure, deformation of the carrier may be minimized by the load transmitted by the first gear by supporting the opposite axial ends of the carrier, to which the planetary gears are coupled, with the reducer housing.

Furthermore, according to the embodiment of the present disclosure, noise of the planetary gears may be minimized and the durability of the reducer may be improved by preventing decentering of the planetary gears.

Although the specific embodiments of the present disclosure have been described until now, the spirit and scope of the present disclosure are not limited to the specific embodiments, and may be variously corrected and modified by an ordinary person in the art, to which the present disclosure pertains, without changing the essence of the present disclosure claimed in the claims.

What is claimed is:
1. An in-wheel driving device comprising:
a driving motor including a motor shaft;
a reducer configured to interwork with the driving motor to reduce a rotational force of the driving motor;
a reducer housing, in which the reducer is disposed;
a first gear connected to the reducer; and
a support bearing part configured to support the reducer on an outer side of the reducer,
wherein the reducer includes:
a sun gear connected to the motor shaft;

a ring gear disposed in the reducer housing;
a planetary gear disposed between the sun gear and the ring gear and engaged with the sun gear and the ring gear; and
a carrier, in which the sun gear is disposed in an interior thereof, configured to support the planetary gear and to rotate in conjunction with rotation of the planetary gear,
wherein the first gear is connected to an outer side of the carrier, and
wherein the support bearing part is disposed between the reducer housing and the carrier, and is mounted on one end and an opposite end of the carrier in an axial direction of the carrier.

2. The in-wheel driving device of claim 1, wherein the reducer housing is configured to be adhered to the support bearing part, and the support bearing part is configured to be adhered to the carrier, such that the one end and the opposite end of the carrier are supported by the reducer housing.

3. The in-wheel driving device of claim 1, further comprising:
a second gear installed in the reducer housing and configured to rotate while being engaged with the first gear.

4. The in-wheel driving device of claim 1, wherein the support bearing part includes:
a first bearing mounted on the one end of the carrier; and
a second bearing mounted on the opposite end of the carrier.

5. The in-wheel driving device of claim 4, wherein the carrier includes:
a body having an interior space, in which the sun gear is disposed, wherein the planetary gear is coupled to the body;
a first gear coupling part formed on an opposite axial side of the body, which is opposite to one axial side of the body, wherein the first gear is coupled to the first gear coupling part;
a first bearing mounting part formed on the one axial side of the body, wherein the first bearing is coupled to the first bearing mounting part; and
a second bearing mounting part formed on an opposite axial side of the first gear coupling part, which is opposite to one axial side of the first gear coupling part, wherein the second bearing is coupled to the second bearing mounting part.

6. The in-wheel driving device of claim 5, wherein a plurality of planetary gears are disposed along a circumferential direction of the sun gear,
wherein the body further includes a planetary gear coupling part coupled with the plurality of planetary gears, and
wherein the planetary gear coupling part has a plurality of gear seating recesses located at a circumference of the interior space, the plurality of planetary gears being coupled to and seated in the plurality of gear seating recesses, respectively.

7. The in-wheel driving device of claim 6, wherein a size of at least one of the plurality of gear seating recesses is larger than a size of the sun gear.

8. The in-wheel driving device of claim 7, wherein an axial width of the at least one of the plurality of gear seating recesses is larger than an axial width of the sun gear, and
a circumferential width of the at least one of the plurality of gear seating recesses is larger than a circumferential width of the sun gear.

9. The in-wheel driving device of claim 7, wherein an axial width of the carrier is larger than an axial width of the sun gear, and a circumferential width of the carrier is larger than a circumferential width of the sun gear.

10. The in-wheel driving device of claim 5, wherein the reducer housing includes:
a ring gear mounting part, on which the ring gear is mounted;
a first bearing seating part located on one side of the ring gear mounting part, and disposed at a location corresponding to the first bearing mounting part such that the first bearing is seated between the first bearing seating part and the first bearing mounting part; and
a second bearing seating part located on an opposite side of the ring gear mounting part, and disposed at a location corresponding to the second bearing mounting part such that the second bearing is seated between the second bearing seating part and the second bearing mounting part.

11. The in-wheel driving device of claim 10, wherein the reducer housing includes a first housing part and a second housing part that are coupled to each other and define a space in which the reducer is disposed,
wherein the ring gear mounting part and the first bearing seating part are formed in the first housing part, and
wherein the second bearing seating part is formed in the second housing part.

12. A method for assembling an in-wheel driving device, the method comprising:
a sun gear assembling operation of inserting a sun gear into an interior space of a carrier through a gear seating recess formed in a planetary gear coupling part of the carrier;
a planetary gear assembling operation of disposing a planetary gear such that the planetary gear is seated in the gear seating recess and is enmeshed with the sun gear and coupling the planetary gear to the planetary gear coupling part;
a first gear assembling operation of assembling a first gear in the carrier such that the first gear rotates together with the carrier when the carrier rotates;
a support bearing part assembling operation of assembling a first bearing and a second bearing in the carrier such that the first bearing is disposed on one side of the planetary gear and the second bearing is disposed on an opposite side of the first gear; and
a housing assembling operation of mounting a reducer assembly, in which the sun gear, the planetary gear, the carrier, the first gear, the first bearing, and the second bearing are assembled, in an interior of the reducer housing.

13. The method of claim 12, wherein the housing assembling operation includes:
an operation of assembling the first bearing and the second bearing such that the first bearing is disposed between the reducer housing and one end of the carrier and the second bearing is disposed between the reducer housing and an opposite end of the carrier.

14. The method of claim 12, wherein the support bearing part assembling operation includes an operation of assembling the first bearing and the second bearing such that the carrier and the first bearing, the carrier and the second bearing are adhered to each other, and
wherein the housing assembling operation includes an operation of mounting the reducer assembly such that the first bearing and the reducer housing, and the second bearing and the reducer housing are adhered to each other.

* * * * *